United States Patent
Singh et al.

(10) Patent No.: US 10,418,136 B2
(45) Date of Patent: Sep. 17, 2019

(54) SYSTEM AND METHOD FOR RECLAIMING ENERGY FROM HEAT EMANATING FROM SPENT NUCLEAR FUEL

(71) Applicant: Holtec International, Inc., Marlton, NJ (US)

(72) Inventors: Krishna P. Singh, Hobe Sound, FL (US); John D. Griffiths, Deptford, NJ (US); Debabrata Mitra-Majumdar, Springfield, PA (US)

(73) Assignee: HOLTEC INTERNATIONAL

( * ) Notice: Subject to any disclaimer, the term of this patent is extended or adjusted under 35 U.S.C. 154(b) by 1055 days.

(21) Appl. No.: 14/639,245

(22) Filed: Mar. 5, 2015

(65) Prior Publication Data

US 2015/0187449 A1  Jul. 2, 2015

Related U.S. Application Data

(63) Continuation of application No. 13/092,143, filed on Apr. 21, 2011, now Pat. No. 9,001,958.

(Continued)

(51) Int. Cl.
*G21C 19/00* (2006.01)
*G21C 19/06* (2006.01)
(Continued)

(52) U.S. Cl.
CPC ............ *G21C 19/06* (2013.01); *G21C 19/07* (2013.01); *G21C 19/08* (2013.01); *G21F 7/015* (2013.01)

(58) Field of Classification Search
CPC ..... G21F 9/00; G21F 9/04; G21F 9/20; G21F 9/22; G21F 9/24; G21F 9/28; G21F 9/34; G21F 9/96; G21C 1/024
See application file for complete search history.

(56) References Cited

U.S. PATENT DOCUMENTS

| 3,111,078 A | 11/1963 | Breckenridge |
| 3,111,586 A | 11/1963 | Rogers |

(Continued)

FOREIGN PATENT DOCUMENTS

| CN | 1345452 | 4/2002 |
| DE | 2821780 | 11/1979 |

(Continued)

OTHER PUBLICATIONS

International Atomic Energy Agency, "Multi-purpose container technologies for spent fuel management," Dec. 2000 (IAEA-TECDOC-1192) pp. 1-49.

(Continued)

*Primary Examiner* — Marshall P O'Connor
(74) *Attorney, Agent, or Firm* — The Belles Group, P.C.

(57) ABSTRACT

The present invention provides a system and method for reclaiming energy from the heat emanating from spent nuclear fuel contained within a canister-based dry storage system. The inventive system and method provides continuous passive cooling of the loaded canisters by utilizing the chimney-effect and reclaims the energy from the air that is heated by the canisters. The inventive system and method, in one embodiment, is particularly suited to store the canisters below-grade, thereby utilizing the natural radiation shielding properties of the sub-grade while still facilitating passive air cooling of the canisters. In another embodiment, the invention focuses on a special arrangement of the spent nuclear fuel within the canisters so that spent nuclear fuel that is hotter than that which is typically allowed to be withdrawn from the spent fuel pools can be used in a dry-storage environment, thereby increasing the amount energy that can be reclaimed.

9 Claims, 6 Drawing Sheets

Related U.S. Application Data

(60) Provisional application No. 61/326,460, filed on Apr. 21, 2010.

(51) Int. Cl.
*G21C 19/07* (2006.01)
*G21C 19/08* (2006.01)
*G21F 7/015* (2006.01)

(56) References Cited

U.S. PATENT DOCUMENTS

| | | |
|---|---|---|
| 3,397,113 A | 8/1968 | Stafford |
| 3,563,263 A | 2/1971 | Benson |
| 3,629,062 A | 12/1971 | Muenchow |
| 3,739,451 A | 6/1973 | Jacobson |
| 3,745,707 A | 7/1973 | Herr |
| 3,755,079 A | 8/1973 | Weinstein et al. |
| 3,765,549 A | 10/1973 | Jones |
| 3,800,973 A | 4/1974 | Weaver |
| 3,836,267 A | 9/1974 | Schatz |
| 3,910,006 A | 10/1975 | James |
| 3,911,684 A | 10/1975 | Busey |
| 3,915,205 A | 10/1975 | Wagner et al. |
| 3,917,953 A | 11/1975 | Wodrich |
| 3,935,062 A | 1/1976 | Keller et al. |
| 3,945,509 A | 3/1976 | Weems |
| 3,962,587 A | 6/1976 | Dufrane et al. |
| 3,984,942 A | 10/1976 | Schroth |
| 3,996,976 A | 12/1976 | Hansel |
| 4,009,985 A | 3/1977 | Hirt |
| 4,055,508 A | 10/1977 | Yoli et al. |
| 4,078,968 A | 3/1978 | Golden et al. |
| 4,148,608 A | 4/1979 | Kaartinen |
| 4,158,599 A | 6/1979 | Andrews et al. |
| 4,247,315 A | 1/1981 | Neumann |
| 4,278,892 A | 7/1981 | Baatz et al. |
| 4,288,698 A | 9/1981 | Baatz et al. |
| 4,291,536 A | 9/1981 | Girard |
| 4,336,460 A | 6/1982 | Best et al. |
| 4,339,547 A | 7/1982 | Corbett et al. |
| 4,355,000 A | 10/1982 | Lumelleau |
| 4,356,146 A | 10/1982 | Knappe |
| 4,366,095 A | 12/1982 | Takats et al. |
| 4,394,022 A | 7/1983 | Gilmore |
| 4,450,134 A | 5/1984 | Soot et al. |
| 4,498,011 A | 2/1985 | Dyck et al. |
| 4,525,324 A | 6/1985 | Spilker et al. |
| 4,526,344 A | 7/1985 | Oswald et al. |
| 4,527,066 A | 7/1985 | Dyck et al. |
| 4,532,104 A | 7/1985 | Wearden et al. |
| 4,532,428 A | 7/1985 | Dyck et al. |
| 4,585,611 A | 4/1986 | Perl |
| 4,634,875 A | 1/1987 | Kugeler et al. |
| 4,635,477 A | 1/1987 | Simon |
| 4,649,018 A | 3/1987 | Waltersdorf |
| 4,663,533 A | 5/1987 | Kok et al. |
| 4,666,659 A | 5/1987 | Lusk |
| 4,671,326 A | 6/1987 | Wilhelm |
| 4,683,533 A | 7/1987 | Shiozaki et al. |
| 4,690,795 A | 9/1987 | Hardin et al. |
| 4,764,333 A | 8/1988 | Minsall et al. |
| 4,780,269 A | 10/1988 | Fischer et al. |
| 4,800,062 A | 1/1989 | Craig et al. |
| 4,832,903 A | 5/1989 | Ealing |
| 4,834,916 A | 5/1989 | Chaudon et al. |
| 4,847,009 A | 7/1989 | Madle et al. |
| 4,851,183 A | 7/1989 | Hampel |
| 4,971,752 A | 11/1990 | Parker |
| 4,986,956 A | 1/1991 | Garabedian |
| 5,102,615 A | 4/1992 | Grande et al. |
| 5,182,076 A | 1/1993 | De Seroux et al. |
| 5,205,966 A | 4/1993 | Elmaleh |
| 5,265,133 A | 11/1993 | Matthews |
| 5,267,280 A | 11/1993 | Duquesne |
| 5,289,857 A | 3/1994 | Pyles |
| 5,297,917 A | 3/1994 | Freneix |
| 5,307,388 A | 4/1994 | Inkester et al. |
| 5,319,686 A | 6/1994 | Pizzano et al. |
| 5,325,896 A | 7/1994 | Koch et al. |
| 5,387,741 A | 2/1995 | Shuttle et al. |
| 5,421,160 A | 6/1995 | Gustafson et al. |
| 5,464,466 A | 11/1995 | Nanaji et al. |
| 5,469,936 A | 11/1995 | Lauga et al. |
| 5,498,825 A | 3/1996 | Stahl |
| 5,513,231 A | 4/1996 | Jones et al. |
| 5,513,232 A | 4/1996 | Jones et al. |
| 5,537,824 A | 7/1996 | Gustafson et al. |
| 5,546,436 A | 8/1996 | Jones et al. |
| 5,564,498 A | 10/1996 | Bochard |
| 5,633,904 A | 5/1997 | Gilligan et al. |
| 5,646,971 A | 7/1997 | Howe |
| 5,661,768 A | 8/1997 | Gilligan et al. |
| 5,753,925 A | 5/1998 | Yamanaka et al. |
| 5,763,735 A | 6/1998 | Stahl |
| 5,771,265 A | 6/1998 | Montazer |
| 5,852,643 A | 12/1998 | Copson |
| 5,862,195 A | 1/1999 | Peterson |
| 5,898,747 A | 4/1999 | Singh |
| 5,926,602 A | 7/1999 | Okura |
| 6,064,710 A | 5/2000 | Singh |
| 6,064,711 A | 5/2000 | Copson |
| 6,074,771 A | 6/2000 | Cubukcu et al. |
| 6,183,243 B1 * | 2/2001 | Snyder .................. G21F 5/005 250/506.1 |
| 6,252,923 B1 | 6/2001 | Iacovino et al. |
| 6,293,996 B1 | 9/2001 | Grantham et al. |
| 6,452,994 B2 | 9/2002 | Pennington |
| 6,489,623 B1 | 12/2002 | Peters et al. |
| 6,519,307 B1 | 2/2003 | Singh et al. |
| 6,519,308 B1 | 2/2003 | Boardman |
| 6,718,000 B2 | 4/2004 | Singh et al. |
| 6,793,450 B2 | 9/2004 | Singh |
| 6,802,671 B1 * | 10/2004 | Badie ...................... G21F 5/10 376/272 |
| 6,853,697 B2 | 2/2005 | Singh et al. |
| 6,953,496 B2 | 10/2005 | Grantham et al. |
| 7,068,748 B2 | 6/2006 | Singh |
| 7,294,375 B2 | 11/2007 | Taniuchi et al. |
| 7,330,526 B2 | 2/2008 | Singh |
| 7,590,213 B1 * | 9/2009 | Singh ...................... G21F 5/00 250/506.1 |
| 7,676,016 B2 | 3/2010 | Singh |
| 7,933,374 B2 | 4/2011 | Singh |
| 8,351,562 B2 | 1/2013 | Singh |
| 2002/0003851 A1 | 1/2002 | Pennington |
| 2004/0067328 A1 | 4/2004 | Taniuchi et al. |
| 2004/0109523 A1 | 6/2004 | Singh et al. |
| 2004/0175259 A1 | 9/2004 | Singh et al. |
| 2004/0182246 A1 | 9/2004 | Singh et al. |
| 2005/0008462 A1 | 1/2005 | Singh et al. |
| 2005/0066541 A1 | 3/2005 | Singh |
| 2005/0207525 A1 | 9/2005 | Singh |
| 2005/0220256 A1 | 10/2005 | Singh |
| 2005/0220257 A1 | 10/2005 | Singh |
| 2006/0215803 A1 | 9/2006 | Singh |
| 2006/0251201 A1 | 11/2006 | Singh |
| 2006/0272175 A1 | 12/2006 | Singh |
| 2006/0288607 A1 | 12/2006 | Singh |
| 2007/0003000 A1 | 1/2007 | Singh et al. |
| 2008/0031396 A1 | 2/2008 | Singh et al. |
| 2008/0031397 A1 | 2/2008 | Singh et al. |
| 2008/0056935 A1 | 3/2008 | Singh |
| 2008/0069291 A1 | 3/2008 | Singh et al. |
| 2008/0076953 A1 | 3/2008 | Singh et al. |
| 2008/0084958 A1 | 4/2008 | Singh et al. |
| 2008/0260088 A1 | 10/2008 | Singh et al. |
| 2008/0265182 A1 | 10/2008 | Singh et al. |
| 2008/0314570 A1 | 12/2008 | Singh et al. |
| 2009/0069621 A1 | 3/2009 | Singh et al. |
| 2009/0158614 A1 | 6/2009 | Singh et al. |
| 2009/0159550 A1 | 6/2009 | Singh et al. |
| 2009/0175404 A1 * | 7/2009 | Singh .................... G21C 19/07 376/272 |
| 2009/0198092 A1 | 8/2009 | Singh et al. |

(56) References Cited

U.S. PATENT DOCUMENTS

| | | |
|---|---|---|
| 2009/0252274 A1 | 10/2009 | Singh |
| 2010/0028193 A1 | 2/2010 | Hanes, III |
| 2010/0150297 A1 | 6/2010 | Singh |
| 2010/0199667 A1 | 8/2010 | Ullman |
| 2010/0212182 A1 | 8/2010 | Singh |
| 2010/0232563 A1 | 9/2010 | Singh et al. |
| 2010/0272225 A1 | 10/2010 | Singh |
| 2010/0282448 A1 | 11/2010 | Singh et al. |
| 2010/0282451 A1 | 11/2010 | Singh et al. |
| 2010/0284506 A1 | 11/2010 | Singh et al. |
| 2011/0021859 A1 | 1/2011 | Singh |
| 2011/0033019 A1 | 2/2011 | Singh et al. |
| 2011/0150164 A1 | 6/2011 | Singh et al. |
| 2011/0172484 A1 | 7/2011 | Singh et al. |
| 2011/0255647 A1 | 10/2011 | Singh |
| 2011/0286567 A1 | 11/2011 | Singh et al. |
| 2012/0037632 A1 | 2/2012 | Singh et al. |
| 2012/0083644 A1 | 4/2012 | Singh |
| 2012/0142991 A1 | 6/2012 | Singh et al. |
| 2012/0226088 A1 | 9/2012 | Singh et al. |
| 2012/0294737 A1 | 11/2012 | Singh et al. |
| 2012/0306172 A1 | 12/2012 | Singh |
| 2012/0307956 A1 | 12/2012 | Singh et al. |
| 2013/0070885 A1 | 3/2013 | Singh et al. |
| 2013/0163710 A1 | 6/2013 | Singh |

FOREIGN PATENT DOCUMENTS

| | | |
|---|---|---|
| DE | 3107158 | 1/1983 |
| DE | 3144113 | 5/1983 |
| DE | 3151475 | 5/1983 |
| DE | 3404666 | 8/1985 |
| DE | 3515871 | 11/1986 |
| DE | 19529357 | 8/1995 |
| EP | 0253730 | 1/1998 |
| EP | 1061011 | 12/2000 |
| EP | 1312874 | 5/2003 |
| EP | 1883933 | 2/2008 |
| FR | 2434463 | 8/1979 |
| GB | 2295484 | 5/1996 |
| GB | 2327722 | 1/1999 |
| GB | 2337722 | 12/1999 |
| JP | 59193000 | 11/1984 |
| JP | S59193000 | 11/1984 |
| JP | 62185199 | 8/1987 |
| JP | 10297678 | 11/1998 |
| JP | 11190799 | 7/1999 |
| JP | 2001056392 | 2/2001 |
| JP | 20011141891 | 5/2001 |
| JP | 2001264483 | 9/2001 |
| JP | 2003207597 | 7/2003 |
| JP | 2003240894 | 8/2003 |
| JP | 2004233055 | 8/2004 |
| KR | 20000000022 | 1/2000 |
| RU | 2168022 | 5/2001 |

OTHER PUBLICATIONS

U.S. Department of Energy, "Conceptual Design for a Waste-Management System that Uses Multipurpose Canisters," Jan. 1994 pp. 1-14.

Federal Register Environmental Documents, "Implementation Plan for the Environment Impact Statement for a Multi-Purpose Canister System for Management of Civilian and Naval Spent Nuclear Fuel," Aug. 30, 1995 (vol. 60, No. 168) pp. 1-7.

National Conference of State Legislatures, "Developing a Multi-purpose Canister System for Spent Nuclear Fuel," State Legislative Report, col. 19, No. 4 by Sia Davis et al., Mar. 1, 1994, pp. 1-4.

Energy Storm Article, "Multi-purpose canister system evaluation: A systems engineering approach," Author unavailable, Sep. 1, 1994 pp. 1-2.

Science, Society, and America's Nuclear Waste—Teacher Guide, "The Role of the Multi-purpose Canister in the Waste Management System," Author—unknown, Date—Unknown, 5 pgs.

USEC Inc. Article, "NAC International: A Leader in Used Fuel Storage Technologies," copyright 2008, 2 pages.

Federal Register Notice, Dept. of Energy, "Record of Decision for a Multi-Purpose Canister or Comparable System," vol. 64, No. 85, May 4, 1999.

Zorpette, Glenn: "Cannel Heat", Nuclear Power, Special Report, in IEEE Spectrum, Nov. 2001, pp. 44-47.

* cited by examiner

SYSTEM AND METHOD FOR RECLAIMING ENERGY FROM HEAT EMANATING FROM SPENT NUCLEAR FUEL

CROSS-REFERENCE TO RELATED APPLICATIONS

The present application is a continuation of U.S. patent application Ser. No. 13/092,143, filed Apr. 21, 2011 (now allowed), which claims the benefit of U.S. Provisional Patent Application Ser. No. 61/326,460, filed Apr. 21, 2010, the entireties of which are hereby incorporated by reference.

FIELD OF THE INVENTION

The present invention relates generally to the field of energy reclamation, and specifically to systems and methods that reclaim energy from heat emanating from passively cooled spent nuclear fuel.

BACKGROUND OF THE INVENTION

In the operation of nuclear reactors, it is customary to remove fuel assemblies after their energy has been depleted down to a predetermined level. Upon removal, this spent nuclear fuel is still highly radioactive and produces considerable heat, requiring that great care be taken in its packaging, transporting, and storing. In order to protect the environment from radiation exposure, spent nuclear fuel is first placed in a transportable canister. One such type of canister that has gained acceptance in the art is the multi-purpose canister ("MPC"). MPCs are hermetically sealed thermally conductive structures that effectuate the dry storage of spent nuclear fuel and are used to transfer and store said spent nuclear fuel.

In a typical nuclear power plant, an open empty canister is first placed in an open transfer cask. The transfer cask and empty canister are then submerged in a pool of water. Spent nuclear fuel is loaded into the canister while the canister and transfer cask remain submerged in the pool of water. Once fully loaded with spent nuclear fuel, a lid is typically placed atop the canister while in the pool. The transfer cask and canister are then removed from the pool of water, the lid of the canister is welded thereon and a lid is installed on the transfer cask. The canister is then properly dewatered and back filled with inert gas. The canister is then hermetically sealed. The transfer cask (which is holding the loaded and hermetically sealed canister) is transported to a location where a storage cask is located. The canister is then transferred from the transfer cask to the storage cask for long term storage. During transfer from the transfer cask to the storage cask, it is imperative that the loaded canister is not exposed to the environment. Once the storage casks are loaded with the canisters, the canisters must be ventilated so that the heat emanating from the spent nuclear fuel (and thermally conducted through the canister) can be removed from the system.

Spent nuclear fuel that is discharged from light water reactors is stored in the fuel pools so that its decay heat can be removed by tubular heat exchangers known as spent fuel pool coolers. The spent fuel pool coolers, either directly or through an intermediate heat exchanger, reject the waste heat to the plant's ultimate heat sink (such as a river, lake, or sea). The rate of decay heat generation from spent nuclear fuel drops rapidly with the passage of time. Most of the thermal energy produced by the used fuel thus winds up as waste heat rejected to the environment (most of it to the local natural source of water). Only after the heat emission rate has attenuated sufficiently can the fuel be transferred to dry storage. The nuclear plant operators have had little choice in the matter because the available dry storage technologies have strict limits on the decay heat that a loaded canister in dry storage can have. The present day limit on NRC licensed systems is roughly in the range of 20 to 45 kW per canister. The canister, upon transfer to dry storage, continues to reject heat to the environment (now, ambient air, in lieu of a body of water when kept in wet storage).

While attempts have been made to create systems for reclaiming the energy resulting from the heat emanating from nuclear waste at storage sites, such systems are inadequate and/or unrealistic in their implementation. See, for example: (1) U.S. Pat. Nos. 3,911,684; 4,292,536; 5,771,265; and U.S. Patent Application Publication No. 2010/0199667. These systems are not particularly suited to work with canister-based dry storage and/or can not be realistically implemented on-site at nuclear power plants. Thus, a need exists for a system and method for reclaiming the energy potential from the heat emanating from nuclear waste that takes the aforementioned deficiencies into consideration.

SUMMARY OF THE INVENTION

The present invention provides a system and method for reclaiming the energy potential from the heat emanating from spent nuclear fuel contained within a canister-based dry storage system. The inventive system and method provides continuous passive cooling of the loaded canisters by utilizing the chimney-effect and reclaims the energy potential from the air that is heated by the canisters. The inventive system and method, in one embodiment, is particularly suited to store the canisters below-grade, thereby utilizing the natural radiation shielding properties of the sub-grade while still facilitating passive air cooling of the canisters. In another embodiment, the invention focuses on a special arrangement of the spent nuclear fuel rods within the canisters so that spent nuclear fuel that is hotter than that which is typically allowed to be withdrawn from the spent fuel pools can be used in a dry-storage environment, thereby increasing the amount energy that can be reclaimed.

In one aspect, the invention can be an energy reclamation system comprising: at least one thermally conductive canister having a hermetically sealed cavity and a central axis, a basket disposed within the hermetically sealed cavity and comprising a grid of cells containing spent nuclear fuel emanating heat, wherein the grid of cells comprises a first region of cells and a second region of cells circumferentially surrounding the first region of cells, wherein the spent nuclear fuel contained within the first region of cells is hotter than the spent nuclear fuel contained within the second region of cells; a storage cavity, the canister disposed within the storage cavity; an air-intake passageway from an ambient environment to a bottom portion of the storage cavity; an air-outlet passageway from a top portion of the storage cavity to an ambient environment; and an energy reclamation unit disposed within the air-outlet passageway.

In another aspect, the invention can be an energy reclamation system comprising: a plurality of storage cavities having substantially vertical axes and arranged in a spaced-apart side-by-side manner; at least one hermetically sealed canister containing spent nuclear fuel emanating heat positioned within each of the storage cavities; an air-intake passageway extending from an ambient environment to a bottom portion of each of the storage cavities; an air-outlet manifold fluidly coupling a top portion of each of the storage cavities to an air-outlet passageway, the air outlet manifold converging heated air exiting the top portions of the storage cavities and directing said converged heated air into the air-outlet passageway; and an energy reclamation unit located within the air-outlet passageway.

In yet another aspect, the invention can be a method of utilizing heat emanating from spent nuclear fuel comprising: positioning at least one canister containing spent nuclear fuel emanating heat in each of a plurality of storage cavities having substantially vertical axes and arranged in a spaced-apart side-by-side manner; the heat emanating from the spent nuclear fuel heating air within the storage cavities, the heated air rising within the storage cavities and exiting the storage cavities at top portions thereof; converging the heated air exiting the top portions of the storage cavities with an air-outlet manifold that is fluidly coupled to the storage shells and directing said converged heated air into an air-outlet passageway; reclaiming energy of the heated air within the air-outlet passageway using an energy reclamation unit; and cool air being drawn into bottom portions of the storage cavities via an air-intake passageway.

Figure 2:
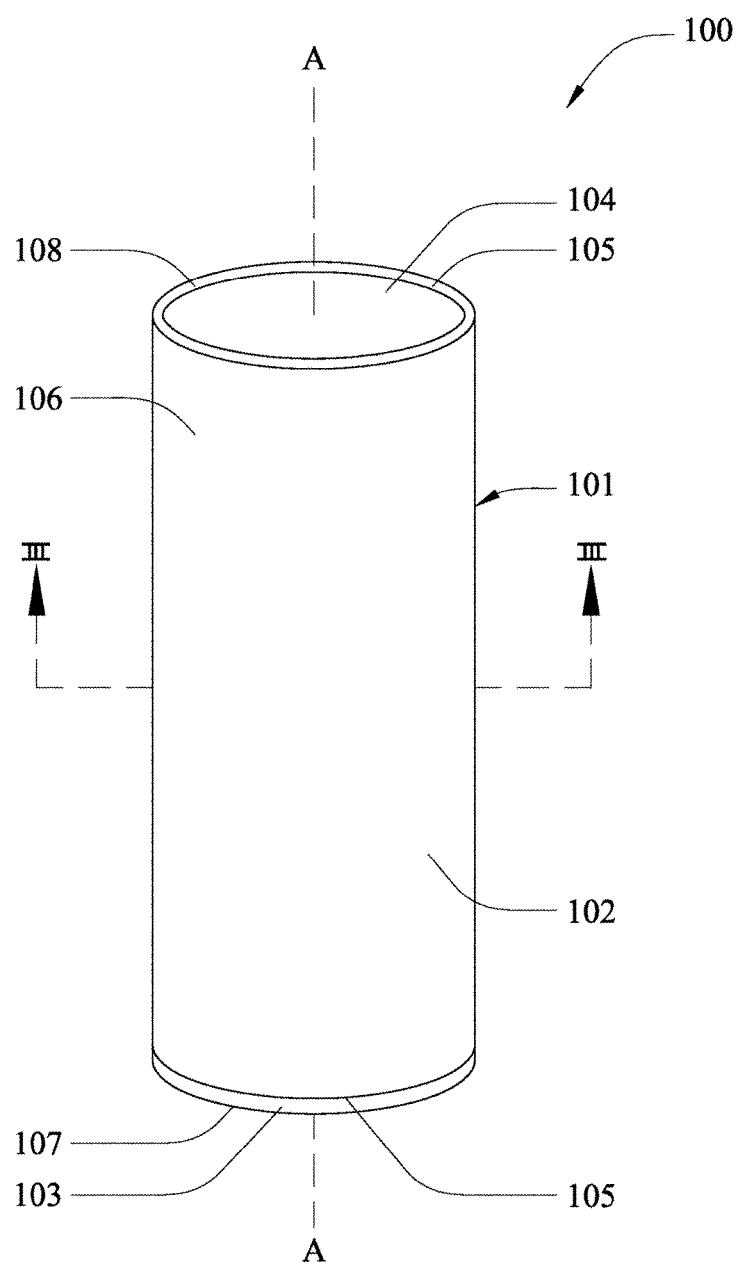
Figure 3:
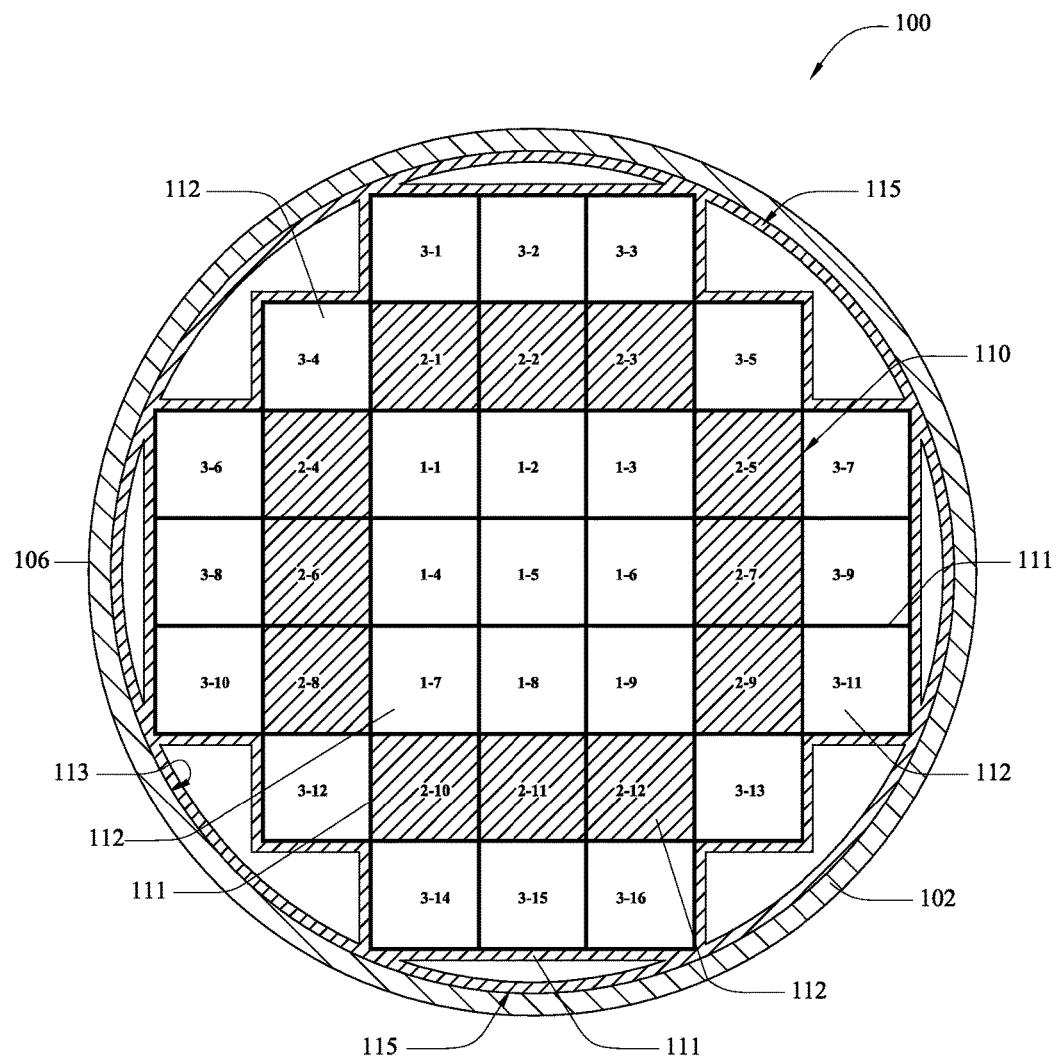
Figure 4:
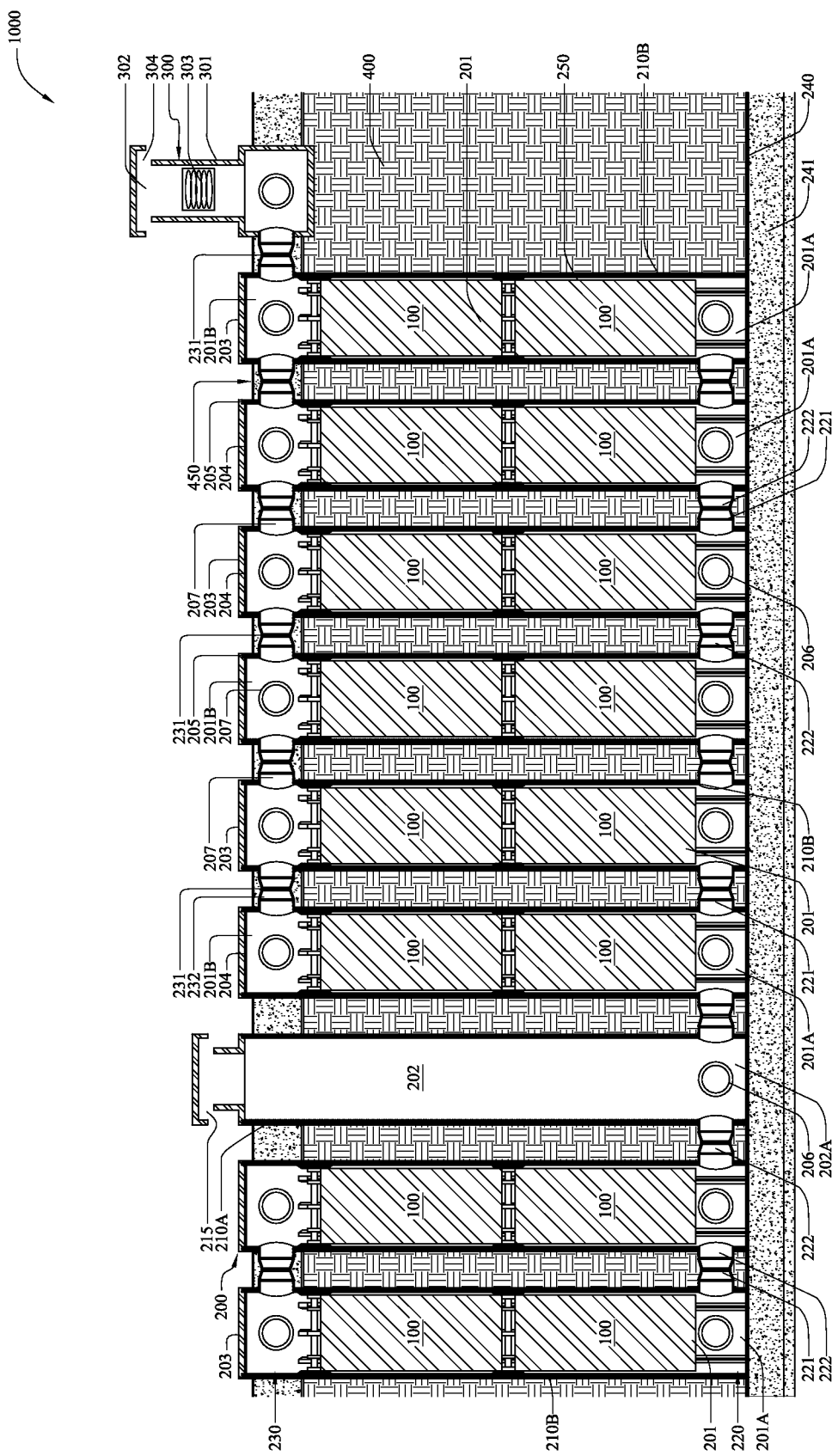
Figure 5:
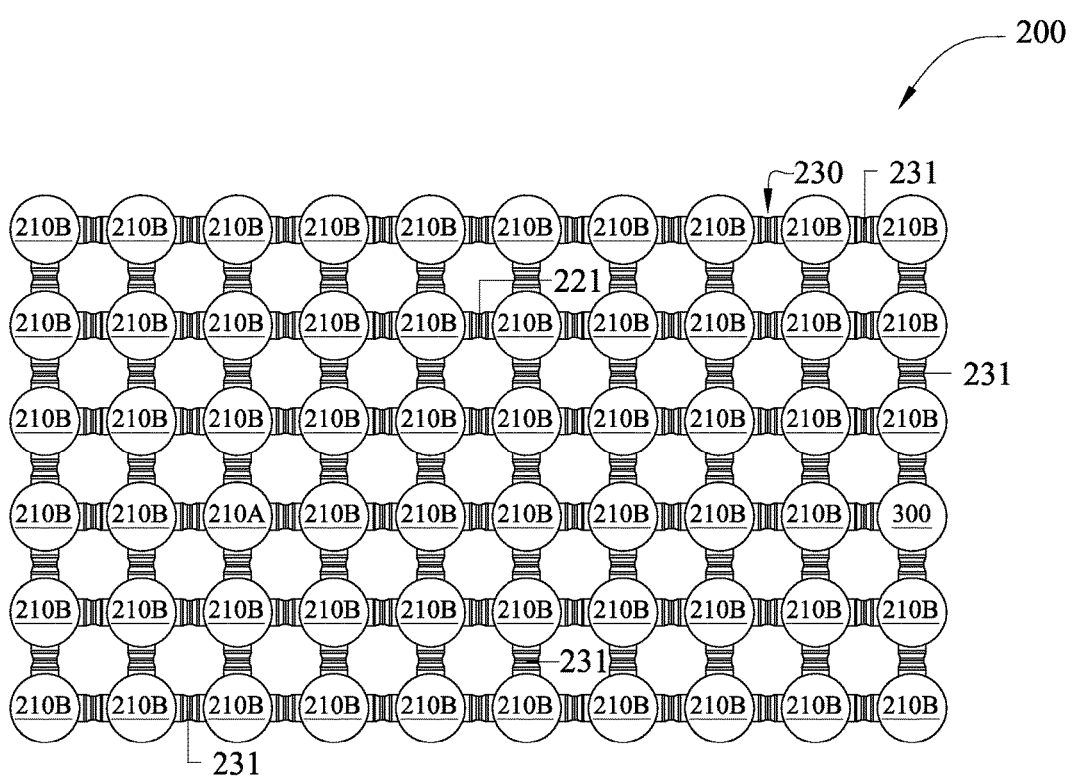
Figure 6:
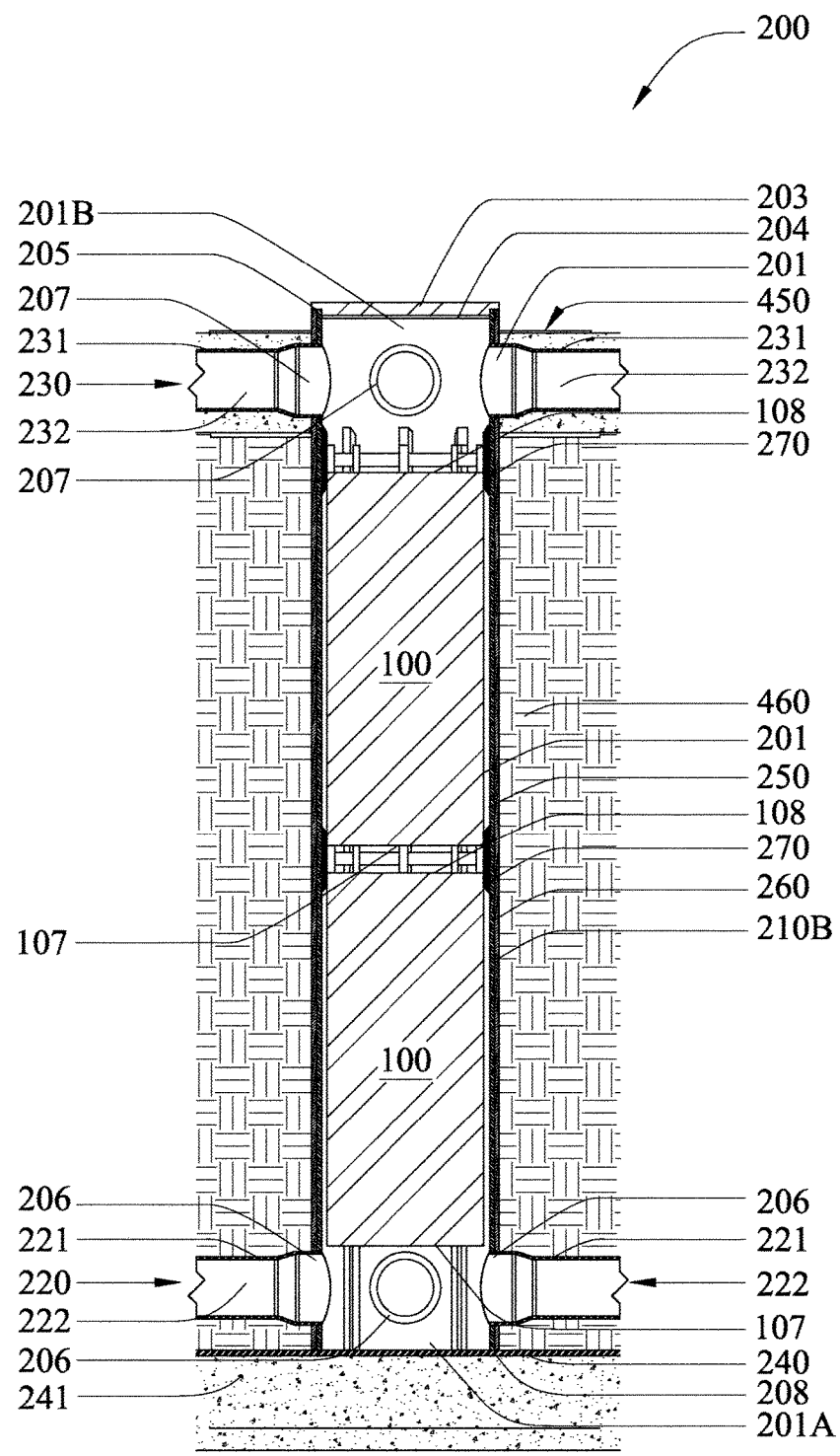

top perspective view of a prior art VVO;

FIG. 2 is a perspective view of a canister according to an embodiment of the present invention that is particularly suited for use in energy reclamation systems and methods for reclaiming the energy from the heat emanating from spent nuclear fuel;

FIG. 3 is a horizontal cross-sectional view of the canister of FIG. 2 taken along view III-III;

FIG. 4 is a vertical cross-sectional view of an energy reclamation system according to an embodiment of the present invention;

FIG. 5 is a top plan view of the cavity enclosure container ("CEC") of the energy reclamation system of FIG. 4 removed from the ground; and FIG. 6 is close-up view of one of the storage cavities of the energy reclamation system of FIG. 4.

DETAILED DESCRIPTION OF THE DRAWINGS

Figure 1:
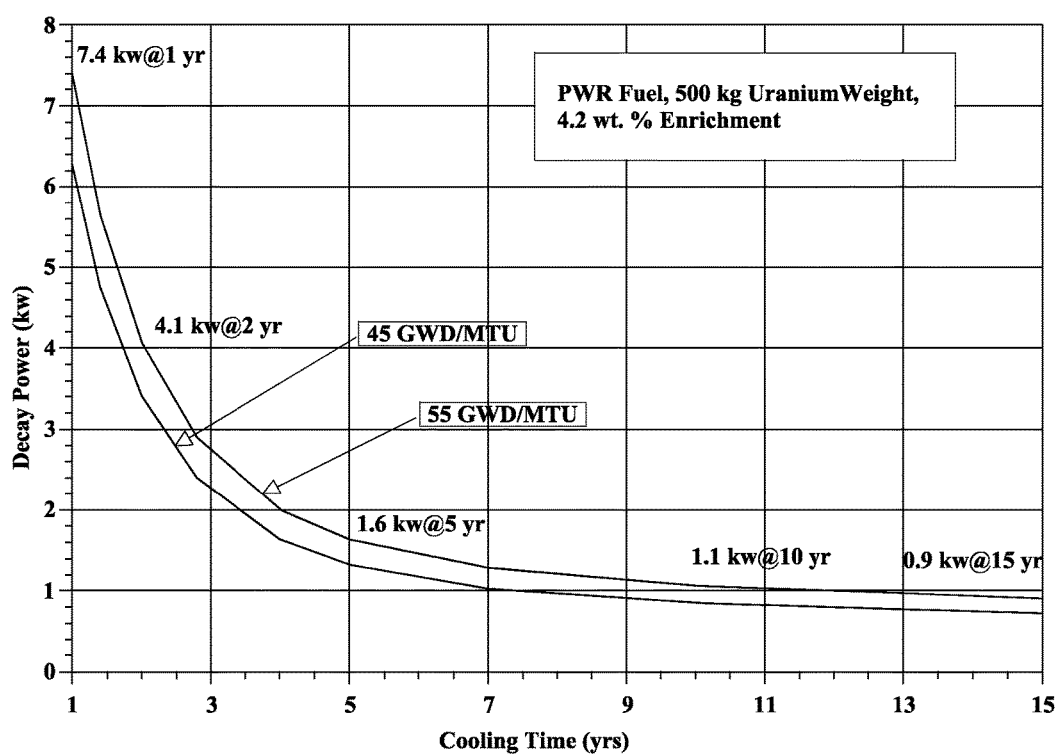
FIG. 1 is a graph of a PWR fuel decay heat attenuation curve.

FIG. 1 shows decay heat attenuation curves for a typical PWR spent nuclear fuel assembly that has accumulated 45 and 55 GWD/MTU burn-up. As can be seen from FIG. 1, the heat generation rate drops first quite steeply and later less rapidly with the passage of time. Nuclear plant operators keep the fuel in the pool for many years, sometimes as long as 10 or 20 years, before moving it to dry storage. Thus, it can be seen that for purposes of reclaiming the energy potential from the heat emanating from the spent nuclear fuel, it is desirable to contain the spent nuclear fuel in a dry storage canister and position said loaded container within an energy reclamation system 1000, such as the one disclosed in FIGS. 4-6, as soon as possible. Of course, this desire must be balanced with the radiation being emitted from the loaded canisters and a safety margin for the heat level.

The present invention changes decay heat produced by spent nuclear fuel from that of waste heat to reclaimable energy. This energy source, like solar power, is entirely green and is extracted by the energy reclamation system 1000 of the present invention, which is also an entirely passive cooling system. An ancillary outcome of this effort would be to remove fuel into dry storage after only a short sojourn in wet storage (perhaps a year or so). This early transfer of fuel from the pool to dry storage will be a welcome boost to the nuclear plant's safety in the eyes of the USNRC, which has publicly held dry storage to be a more robust storage configuration than its wet counterpart.

Referring now to FIGS. 2-3 concurrently, a canister 100 according to one embodiment of the present invention is illustrated. In the exemplified embodiment, the canister 100 is a multi-purpose canister ("MPC") that comprises a thermally conductive body 101 that is hermetically sealed to contain spent nuclear fuel in a dry storage environment. The thermally conductive body 101 generally comprises a canister shell 102, a bottom enclosure plate 103 and a top enclosure plate 104. The canister shell 102, the bottom enclosure plate 103 and the top enclosure plate 104 are connected at their interfaces 105 so that a hermetically sealed canister cavity is formed therein. Hermetic sealing of the interfaces 105 can be accomplished via seal welding and/or the use gaskets as is known in the art.

The canister 100 extends from a bottom 107 to a top 108 along a longitudinal axis A-A. When positioned within the energy reclamation system 1000 for storage and passive cooling, the canister 100 is oriented so that the longitudinal axis A-A is substantially vertical. The canister 100 is particularly suited for use in an energy reclamation system 1000, such as the one disclosed in FIGS. 4-6, that reclaims the energy potential of heat emanating from spent nuclear fuel. The canister 100 is an extremely efficient heat-rejecting MPC that is capable of holding spent nuclear fuel with an aggregate heat load in excess of 60 kWs while maintaining the peak cladding temperature of the contained spent nuclear fuel below the U.S.N.R.C. limit of 400° C. (U.S.N.R.C. ISG-11 Rev 3).

In order to ensure thermal conductivity, the canister shell 102, the bottom enclosure plate 103 and the top enclosure plate 104 are constructed of a thermally conductive material, such as carbon steel. If desired, the outer surface 106 of the canister a body 101 may be galvanized or coated (flame-sprayed or weld overlaid with a corrosion-resistant veneer) to protect against long-term corrosion. Moreover, if increased heat dissipation is desired, the outer surface 106 of the canister shell 102 may include features to increase its overall surface area. For example, the outer surface 106 may be given a non-smooth topography, such as dimpled, pitted, roughened, waved, and/or combinations thereof. Moreover, in certain embodiments, a plurality of fins could be coupled to the outer surface 106 in order to increase the overall heat dissipating area. Such fins could be longitudinally extending fins that are arranged in a spaced-apart manner about the circumference of the canister 100. The canister 100 can be manufactured in the manner of an MPC (see U.S.N.R.C. Docket No. 72-1014).

The canister 100 further comprises a fuel basket 110 that is positioned within the hermetically sealed cavity formed by the canister body 101. In certain embodiments, the fuel basket 110 can be constructed of a metal matrix composite material, such as a discontinuously reinforced aluminum/boron carbide metal matrix composite material. One particularly suitable material is disclosed in U.S. Patent Application Publication No. 2010/0028193, filed as U.S. Ser. No. 12/312,089 on Jun. 14, 2007, the entirety of which is hereby incorporated by reference. Such material is commercially available as Metamic-HT™, which is a nanotechnology product containing aluminum and boron carbide that has an exceedingly high thermal conductivity and in the anodized state possesses an extremely high emissivity as well.

The fuel basket 110 is formed by a gridwork of plates 111 arranged in a rectilinear configuration so as to form a grid of cells 112. Such an arrangement is licensed by the U.S.N.R.C. in Docket Mo. 71-9325. The cells 112 are elongated cells that extend substantially parallel to the longitudinal axis A-A. Thus, the cells 112 are substantially vertically oriented spaces having a generally rectangular horizontal cross-sectional configuration. Each cell 50 is designed to accommodate at least one spent nuclear fuel rod. Thus, the fuel basket 110 (and thus the cells 112) has a height that is greater than or equal to the height of the spent nuclear fuel rods for which the fuel basket 110 is designed to accommodate. One suitable construction of the fuel basket 110 is disclosed in U.S. Patent Application Publication 2008/0031396. filed as U.S. Ser. No. 11/772,610 on Jul. 2, 2007, the entirety of which is hereby incorporated by reference. Another suitable construction for the fuel basket 110 is disclosed in U.S. Pat. No. 5,898,747, issued on Apr. 27, 1999, the entirety of which is hereby incorporated by reference.

The canister 100 further comprises a fuel basket spacer 115. In the exemplified embodiment, the fuel basket spacer 115 is a ring-like structure that circumferentially surrounds the fuel basket 110. However, in alternate embodiment, the fuel basket spacer 115 may be in the form of non-connected shims that fill the spaces between the fuel basket 110 and the inner surface 113 of the canister shell 102. The fuel basket spacer 115 is designed to provide conformal surface contact between the inner surface 113 of the canister shell 102 and the outermost peripheral panels 111 of the fuel basket 110 so as to provide an efficient path for the transmission of heat. In certain embodiments, the fuel basket spacer 115 can be constructed of an aluminum alloy (high thermal conductivity and thermal emissivity) in the manner of MPC-37 and MPC-89 fuel baskets in U.S.N.R.C. Docket Nos. 72-1032 and 71-9325. Other suitable fuel basket spacers 115 are disclosed in detail in U.S. Patent Application Publication 2008/0031397, filed as U.S. Ser. No. 11/772,620 on Jul. 2, 2010, the entirety of which is hereby incorporated by reference.

In certain embodiments, the fuel basket spacer 115 is preferably constructed of a material that has a coefficient of thermal expansion that is greater than the coefficient of thermal expansion of the material of which the canister shell 102 is constructed, which in one embodiment is at least 20%. Because the fuel basket spacer 115 is constructed of a material having a greater coefficient of thermal expansion than that of the canister shell 102, the fuel basket spacer 115 expands at a greater rate and a larger amount than the canister shell 102 when subjected to heat emanating from spent nuclear fuel loaded within the cells 112. As a result, the outside surfaces of the fuel basket spacer 115 becomes pressed against the inner surface 113 of the canister shell 102, thereby achieving substantially continuous surface contact therebetween. Similarly, the inner surface of the fuel basket spacer 115 and the outer surface of the fuel basket 110 will also come into substantially continuous surface contact with each other so as to be under compression.

Furthermore, the canister 100 is further configured to achieve a cyclical thermosiphon flow of gas within the hermetically sealed cavity of the canister body 102 when spent nuclear fuel emanating heat is contained within the cells 122. Such cyclical thermosiphon flow of the gas further enhances the transmission of heat to the outer surface 106 of the canister 100. Achieving cyclical thermosiphon flow within the canister can be achieved by providing downcomer passageways 116 within the fuel basket spacer 115 and providing cutouts in the top and bottom of the gridwork of plates 111 to form top and bottom distribution plenums. Suitable configurations to achieve such cyclical thermosiphon flow are disclosed in U.S. Patent U.S. Patent Application Publication 2008/0031396, filed as U.S. Ser. No. 11/772,610 on Jul. 2, 2007, and U.S. Pat. No. 5,898,747. issued on Apr. 27, 1999, the entireties of which are hereby incorporated by reference.

In accordance with the present invention, spent nuclear fuel will be stored within the canister 100 in a special arrangement, which is shown in FIG. 3. In accordance with this arrangement, the grid of cells 112 is conceptually divided into three regions. The first region of the cells comprises the cells 1-1 to 1-9 and is centrally located along the longitudinal axis A-A. The hottest spent nuclear fuel is contained within the first region of cells 1-1 to 1-9. The second region of cells comprises cells 2-1 to 2-12. The second region of cells 2-1 to 2-12 circumferentially surrounds the first region of cells 1-1 to 1-9 and contains spent nuclear fuel that is cooler than the spent nuclear fuel contained within the first region of cells 1-1 to 1-9. The third region of cells 3-1 to 3-16 circumferentially surrounds the second region of cells 2-1 to 2-12 and contains spent nuclear fuel that is cooler than the spent nuclear fuel contained within the second region of cells 2-1 to 1-12. Thus, the hottest spent nuclear fuel is contained within the central region of the fuel basket 110 while the coldest spent nuclear fuel is contained within in the radially outermost region. The cold spent nuclear fuel in the outer second and third regions create a shielding buffer around the very hot spent nuclear fuel (that can be only one year old) contained within the first region. This allows the canister 100 to be loaded with very hot spent nuclear fuel, without excessive dose to personnel. While the fuel basket 110 is divided into three regions in the exemplified embodiment, it is possible for more less regions to be utilized as desired.

While the canister 100 is particularly suited for use in the energy reclamation system 1000 described below, it is to be understood that the canister 100 can be used in other energy reclamation systems where it is desirable to maximize the amount of heat emanating from the spent nuclear fuel that can be reclaimed. Moreover, all canister types engineered for the dry storage of spent fuel can be used in conjunction with the energy reclamation system 1000 described below. Suitable other canisters include, without limitation, the MPC that is disclosed in U.S. Pat. No. 5,898,747 to Krishna Singh, issued Apr. 27, 1999, the entirety of which is hereby incorporated by reference.

Referring now to FIGS. 3-6 concurrently, an energy reclamation system 1000 is exemplified according to an embodiment of the present invention. The energy reclamation system generally comprises a cavity enclosure array ("CEA") 200 and an energy reclamation chamber 300. The energy reclamation chamber 300 comprises a housing 301 forming a energy reclamation cavity 302 in which an energy reclamation unit 303 is operably positioned. The energy reclamation chamber 300 is fluidly coupled to the CEA 200 so that heated air exiting the CEA 200 flows into the energy reclamation cavity 301, flows into operable contact with the energy reclamation unit 303, and flows out of the energy reclamation cavity 301, thereby escaping into the ambient atmosphere via outlet openings 304. The heated air flowing out of the CEA 200 is heated by the heat emanating from the spent nuclear fuel contained within the canisters 100 that are stored within the CEA 200 as discussed below. As further discussed below, the air flow through the CEA 200 is passive in nature in that its flow is driven by the chimney-effect.

In the exemplified embodiment, the energy reclamation unit 303 is a heat exchanger that can extract thermal energy from the heated air flowing through the energy reclamation chamber 300 and transfer said extracted thermal energy into a second fluid, such as water. The heat exchanger may be a cross flow heat exchanger in which the heated air flowing through the energy reclamation chamber 300 flows in "cross flow" across a finned bundle carrying a tube-side fluid, such as pressurized water. Depending on the quantity and temperature of the heated air flowing through the energy reclamation chamber 300, the heated water may be used as feed water to the power plant, or to provide heated service water to the site. In one embodiment, the energy reclamation unit 303 is a heat exchanger that is part of a Rankine cycle power generation system. However, in alternate embodiments, if the decay heat is sufficiently high, then it is also possible to produce electric power using a wind mill or another energy conversion device. In such an embodiment, the energy reclamation unit 303 may be a wind turbine.

While not limited in all embodiments, the CEA 200 is specifically designed to achieve the dry storage of multiple hermetically sealed canisters 100 containing spent nuclear fuel in a below grade environment, while at the same time harnessing the air heated by the spent nuclear fuel within the canisters 100. The CEA 200 converges the heated air streams exiting the storage cavities 201 and directs the converged heated air flow into the energy reclamation chamber 300 so that the energy within the heated air flow can be reclaimed by the energy reclamation unit 303.

The CEA 200 is a vertical, ventilated dry spent fuel storage system that is fully compatible with 100 ton and 125 ton transfer casks for spent fuel canister transfer operations. The CEA 200 can be modified/designed to be compatible with any size or style transfer cask. The CEA 200 is designed to accept multiple spent fuel canisters for storage at an Independent Spent Fuel Storage Installation ("ISFST") or on-site at nuclear power plants.

The CEA 200 is a storage system that facilitates the passive cooling of the canisters 100 disposed therein through natural convention/ventilation. The CEA 200 is free of forced cooling equipment, such as blowers and closed-loop cooling systems. Instead. the CEA 200 utilizes the natural phenomena of rising warmed air, i.e., the chimney effect, to effectuate the necessary circulation of air about the canisters 100. In essence, the CEA 200 comprises a plurality of modified ventilated vertical modules that can achieve the necessary ventilation/cooling of multiple canisters 100 containing spent nuclear in a below grade environment, while at the same time converging and directing the heated air exiting each of the storage cavities 201 to energy reclamation chamber 300.

The CEA 200 generally comprises a vertically oriented air-intake shell 210A, a plurality of vertically oriented storage shells 210B, an air-intake manifold 220 and an air-outlet manifold 230. The storage shells 210B and the air-intake shell 210A are secured to a baseplate 240 (FIG. 6) that is in turn secured atop a reinforced concrete pad 241. The baseplate(s) 240 can be keyed to prevent lateral sliding during an earthquake. The connection between the bottom edges 208 of the storage shells 210B and the air-intake shell 210A and the baseplate 240 is a hermetic seal so as t0 prevent the ingress of below grade fluids.

In the exemplified embodiment, only a single air-intake shell 210A and a single energy reclamation chamber 300 (which acts as an outlet plenum) is utilized. However, in alternate embodiments, more than one air-intake shell 210A and/or energy reclamation chamber 300 can be incorporated into the CEA 200 as desired.

The storage shells 210B surround the air-intake shell 210A. In the exemplified embodiment, the air-intake shell 210A is structurally similar to the storage shells 210B, with the exception that the air-intake shell 210A is not fluidly coupled to the air-outlet manifold 230 (discussed in greater detail below). As will be discussed below, the air-intake shell 210A remains empty (i.e., free of a heat load and unobstructed) so that it can act as an inlet passageway for cool air to enter the air-inlet manifold 220. Each of the storage shells 10B form a storage cavity 201 which receives at least one hermetically sealed canister 100 containing spent nuclear fuel.

It should be noted that in alternate embodiments, the air-intake shell 210A can be designed to be structurally different than the storage shells 210B so long as the air-intake cavity 202 of the air-intake shell 10A allows cool air to enter the air-inlet manifold 220 so that said cool air can ventilate the storage shells 210B. Stated simply, the air-intake cavity 202 of the air-intake shell 10A acts as a downcomer passageway for the inlet of cooling air into the air-inlet manifold 220. For example, the air-intake shell 210A can have a cross-sectional shape, cross-sectional size, material of construction and/or height that can be different than that of the storage shells 210B.

In the exemplified embodiment, both the air-intake shell 210A and the storage shells 210B are cylindrical in shape having a circular horizontal cross-section. However, in other embodiments the shells 210A, 210B can take on other shapes, such as rectangular, etc.

The shells 210A, 210B have an open top end and a closed bottom end. The shells 210A, 210B are arranged in a side-by-side orientation forming an array. The air-intake shell 210A is located in a non-perimeter location of the array. The invention, however, is not so limited. The location of the air-intake shell 210A in the array can be varied as desired The shells 210A, 210B are preferably in a spaced-apart in a side-by-side relationship with respect to one another. The horizontal distance between the vertical center axis of the shells 210A, 210B is in the range of about 10 to 20 feet, and more preferably about 15 feet. However, the exact distance between shells 210A. 2101B will be determined on case by case basis and is not limiting of the present invention.

The shells 210A, 210B are preferably constructed of a thick metal, such as steel, including low carbon steel. However, other materials can be used, including without limitation metals, alloys and plastics. Other examples include stainless steel, aluminum, aluminum-alloys, lead, and the like. The thickness of the shells 210A, 210B is preferably in the range of 0.5 to 4 inches, and most preferably about 1 inch. However, the exact thickness of the shells 210A, 210B will be determined on a case-by-case basis, considering such factors as the material of construction, the heat load of the spent fuel being stored, and the radiation level of the spent fuel being stored.

The CEA 200 further comprises a removable lid 203 positioned atop each of the storage shells 210B. The lids 203 are positioned atop the storage shells 210B, thereby enclosing the open top ends of the storage cavities 201 formed by the storage shells 210B. The lids 203 provide the necessary radiation shielding so as to prevent radiation from escaping upward from the storage cavities 201 formed by the storage shells 10B when the canisters 100 containing spent nuclear fuel are positioned therein. The lids 203 are secured to the storage shells 210B by bolts or other detachable connectors. The lids 203 are capable of being removed from the storage shells 210B without compromising the integrity of and/or otherwise damaging either the lids 203 or the storage shells 210B. In other words, each lid 203 forms a non-unitary structure with respect to its corresponding storage shell 210B. In certain embodiments, however, the lids 203 may be secured to the storage shells 210B via welding or other semi-permanent connection techniques that are implemented once the storage shells 210B are loaded with one or more canisters 100 loaded with spent nuclear fuel.

The removable lids 203 further comprises one or more layers of insulation 204 on a bottom surface thereof to prevent the heated air that rises into the top portions 201B of the storage cavities 201 from being cooled prior to (or during) flow through the air-outlet manifold 230. The lids 203 are detachably secured to top edges 205 of the storage shells 210B so that a hermetic seal is formed therebetween that prevents in-leakage of water. This can be accomplished through the use of gaskets or a seal weld. The lids 203 are solid and include no penetrations or passages. Thus, when the lids 203 are secured t the storage shells 210B, the top ends of the storage cavities 201 are hermetically sealed (with the exception of the air-outlet passageways formed by the air-outlet manifold 230 of course).

Referring still to FIGS. 4-6 concurrently, the CEA 200 further comprises an air-inlet manifold 220. The air-inlet manifold 220, in the exemplified embodiment, is a network of pipes 221 that fluidly couple the storage cavities 201 of the storage shells 210B together and to the air-intake cavity 202 of the air-intake shell 210A. More specifically, the network of pipes 221 that form the air-inlet manifold 220 form hermetically sealed horizontal passageways 222 between the bottom portions 201A of the storage cavities 201 and the bottom portion 202A of the air-intake cavity 202.

The air-intake shell 210A (and thus the air-intake cavity 202) extends from above the grade 450 of the ground 400 to protect against intrusion of debris, floodwater, etc., and to provide for an improved air suction action. One air-intake cavity 202 may serve an array of storage cavities 201 through the air-inlet manifold 220. The air-intake cavity 202 of the air-intake shell 210A, in combination with the various hermetically sealed passageways 222 of the air-intake manifold 220 form an air-intake passageway extending from the ambient atmosphere to the bottom portion 201A of each of the storage cavities 201. As result, cool air can enter the inlet openings 215 of the air-intake shell 210A. flow downward into the air-intake cavity 202, flow through the hermetically sealed passageways 222, and into the bottom portions 201A of the storage cavities via the inlet openings 206 formed in the sidewalls of the storage shells 210B. Once inside the storage cavities, this cool air will be drawn upward through the storage cavities 201 and into contact with the canisters 100 as discussed below.

Conceptually, the air-intake manifold 220 acts as a lower plenum that distributes incoming cool air to from the air-intake cavity 202 of the air-intake shell 201A to the storage cavities 201 of the storage shells 210B. In alternate embodiments, however, the air-intake passageway that extends from the ambient atmosphere to the bottom portions 201A of the storage cavities 201 can be separate and distinct passageways for each storage cavity 201 and do not have to run through a manifold and/or common air-intake cavity.

The network of pipes 221 of the air-inlet manifold 220 that join storage shells 210B are equipped with an expansion joint 225 that acts as a "flexible shell element" to structurally decouple each of the storage shells 210B from one another and the air-intake shell 210A.

The CEA 200 further comprises an air-outlet manifold 230 that fluidly couples the top portions 201B of the storage cavities 201 of the storage shells 210B to one another and to the energy reclamation chamber 300. The air-outlet manifold 230 is not fluidly coupled to the air-intake cavity 202 of the air intake shell 210A. The air-outlet manifold 230, in the exemplified embodiment, is a network of pipes 231 that fluidly couple the storage cavities 201 of the storage shells 210B together and to the energy reclamation chamber 300. More specifically, the network of pipes 231 that form the air-outlet manifold 220 form hermetically sealed horizontal passageways 232 between the top portions 201B of the storage cavities 201 and the energy reclamation cavity 302 of the energy reclamation chamber 300.

The energy reclamation cavity 302, in combination with the various hermetically sealed passageways 232 of the air-outlet manifold 230, form an air-outlet passageway extending from the top portion 201B of each of the storage cavities 201 to the ambient atmosphere. As a result, heated air within the top portions 201B of the storage cavities 201 can exit the storage cavities 201 through the outlet openings 215 of the storage shells 210B, flow through the hermetically sealed passageways 232, and into the energy reclamation chamber 300 where the energy from the heated air is reclaimed by the energy reclamation unit 303. The outlet openings 207 are located within the sidewalls of the storage shells 210B. One energy reclamation chamber 300 may serve an array of storage cavities 201 through the air-outlet manifold 220. The top edges 205 of the storage shells 210A extend equal to or above the grade 450 of the ground 400 so that each of the storage cavities 201 can be independently accessed from above-grade.

While one embodiment of a plumbing/layout for the networks of pipes 221, 231 of the air-intake and air-outlet manifolds 220 is illustrated, the invention is not limited to any specific layout. Those skilled in the art will understand that an infinite number of design layouts can exist for the piping networks. Furthermore, depending on the ventilation and air flow needs of any given energy reclamation system 1000, the piping network may or may not comprise headers and/or expansion joints. The exact layout and component needs of any piping network will be determined on case-by-case design basis.

The internal surfaces of the air-intake and air-outlet manifolds 220, 230 and the shells 210A, 210B are preferably smooth so as to minimize pressure loss. Similarly, ensuring that all angled portions of the piping network are of a curved configuration will further minimize pressure loss. The size of the pipes 221, 231 can be of any size. The exact size of the ducts will be determined on case-by-case basis considering such factors as the necessary rate of air flow needed to effectively cool the canisters.

All components (pipes. expansion joints, etc.) of the air-intake and air-outlet manifolds 220, 230 are seal joined to one another at all connection points. Moreover, the air-intake manifold 220 is seal joined to all of the shells 210A, 210B while the air-outlet manifold 230 is seal joined to all of the storage shells 210B and the energy reclamation chamber 300, thereby forming an integral/unitary structure that is hermetically sealed to the ingress of water and other fluids. In the case of weldable metals, this seal joining may comprise welding and/or the use of gaskets. Thus, the only way water or other fluids can enter any of the cavities 201, 202 of the shells 210A, 210B or the manifolds 220, 230 is through the inlet openings 215 of the air-intake shell 210A and the outlet openings 304 of the energy reclamation chamber 300.

An appropriate preservative, such as a coal tar epoxy or the like, is applied to the exposed surfaces of shells 210A, 210B and the manifolds 220, 230 to ensure sealing, to decrease decay of the materials, and to protect against fire. A suitable coal tar epoxy is produced by Carboline Company out of St. Louis, Mo. under the tradename Bitumastic 300M.

A layer of insulating material 260 circumferentially surrounds each of the storage cavities 201. The layer of insulating material layer 260 may be located within or outside of the storage shells 110B. Suitable forms of insulation include, without limitation, blankets of alumina-silica fire clay (Kaowool Blanket), oxides of alumina and silica (Kaowool S Blanket), alumina-silica-zirconia fiber (Cerablanket), and alumina-silica-chromia (Cerachrome Blanket). The insulation 260 prevents excessive transmission of heat from spent nuclear fuel of the canisters 100 within the storage shells 210B to the surrounding radiation absorbing material 400, which can be the ground, a concrete mass or other engineered fill. Moreover, the network of pipes 231 of the air-outlet manifold 230 can also be insulated in a similar manner to further minimize heat loss.

Insulating the storage shells 210B and the air-outlet manifold 230 serves to minimize the heat-up of the incoming cooling air before it enters the storage cavities 201 of the storage shells 210B and preserves the thermal energy of the heated air as is travels through the air-outlet manifold 230 to the energy reclamation chamber 300.

As mentioned above, each of the storage shells 210B and the air-intake shell 210A are arranged in a side-by-side relation so that the bottoms edges 208 of the shells 210A, 210B are located in the same plane. Similarly, the top edges 205 of all of the storage shells 210A, 210B are also located in the same plane. In one embodiment, the entirety of the both the air-intake and air-outlet manifolds 220, 230 are located in or between these planes respectively.

Each of the air-intake shell 210A and the energy reclamation chamber 300 comprises a cap that prohibits rain water and other debris from entering into the inlet and outlet openings 115, 304 while affording cool air to enter and heated air to escape the system 100 respectively.

The storage shells 210B form vertically oriented cylindrical storage cavities 201. While the storage cavities 201 are cylindrical in shape having a circular horizontal cross-section, the storage cavities 210B are not limited to any specific shape, but can be designed to receive and store almost any shape of canister 100 without departing from the spirit of the invention. The horizontal cross-sectional size and shape of the storage cavities 201 of the storage shells 210B are designed to generally correspond to the horizontal cross-sectional size and shape of the spent fuel canisters 100 that are to be stored therein. The horizontal cross-section of the storage cavities 201 of the storage shells 210B accommodate no more than one canister 100 of spent nuclear fuel.

Further, the horizontal cross-sections of the storage cavities 201 of the storage shells 210B are sized and shaped so that when the canisters 100 are positioned therein for storage, an annular gap/clearance 250 exists between the outer side walls of the canisters 100 and the inner side walls of cavities 201. Designing the storage cavities 201 of the storage shells 210B so that a small gap 250 is formed between the side walls of the stored canisters 100 and the side walls of the storage cavities 201 limit the degree the canisters 100 can move within the storage cavities 201 during a catastrophic event, thereby minimizing damage to the canisters 100 and the cavity walls and prohibiting the canisters 100 from tipping over within the storage cavities 201. These small gaps 250 also facilitate flow of the heated air during spent nuclear fuel cooling. The exact size of the annular gaps 250 can be controlled/designed to achieve the desired fluid flow dynamics and heat transfer capabilities for any given situation. The size of the air flow gaps 250 can also be selected with the aid of a suitable Computational Fluid Dynamics model to maximize the temperature of the exiting heated air. In one embodiment, the annular gaps 250 have a width of about 1 to 3 inches.

Depending on the site, the storage cavities 201 may be stacked with 2 or 3 canisters 100 to maximize the heat load in each storage cavity 201. Stacked canisters 100 can be supported by a set of wedge-type supports 270 that also act as seismic restraints against excessive lateral rattling of the canisters 100 under an earthquake event. The wedge type restraints 270 are designed to minimize hydraulic resistance to the axial flow of ventilation air. The top region of the uppermost canister 100 in the stack is also protected from excessive rattling by the wedge-type restraints 270.

When loaded within the storage cavities 201, the canisters 100 are positioned so that the top 108 of the uppermost canister 100 within the stack is below the bottoms of the outlet openings 207 that allow the heated air within the top portions 201B of the storage cavities 201 to enter into the air-outlet manifold 230. Thought of another way, the outlet openings 207 are at a greater elevation than the tops 108 of the uppermost canisters 100 in the stack. Similarly, the lowermost canister 100 in the stacks sit atop a set of alignment lugs that are located such that the bottoms 107 of the lowermost canister 100 in the stacks are above the inlet openings 206 thru which ventilation air enters the bottom portions 201A of the storage cavities 201. Thought of another way, the inlet openings 206 are located at an elevation that is lower than the bottoms 107 of the lowermost canisters 100 in the stacks. When only a single canister 100 is positioned within the storage cavities 201, the canister 100 can be considered both the uppermost and lower most canister for these purposes.

In the illustrated embodiment of the energy reclamation system 1000. a radiation absorbing material 400 surrounds the shells 210A, 210B and the manifolds 220, 230. The radiation absorbing material 400 can be a concrete monolith, soil, or a suitable engineered fill. Furthermore, a top surface pad made of reinforced concrete or a similar structurally competent slab, surrounds the top portions of the storage shells 210B and the air-outlet manifold 230 and serves as the haul path and staging surface for the canister installation or extraction. The radiation absorbing material 400 provides the necessary radiation shielding for the spent nuclear fuel canisters 100 stored in the storage shells 210B.

As mentioned above, the CEA 200 is particularly suited to effectuate the storage of spent nuclear fuel canisters 100 in a below grade environment. The CEA 200, including the radiation absorbing material 400. is positioned so that at least the major portions of the heights of the storage shells 210B are below the grade 450. Thus, the storage shells 210B are fully or partially surrounded by the subgrade. Both the air-intake and air-outlet manifolds are also located below the grade 450.

By positioning the CEA 200 below the grade 450, the system 1000 is unobtrusive in appearance and there is no danger of tipping over. The low profile of the underground manifold storage system 1000 does not present a target for missile or other attacks. A small portion that includes the top edges 105 of the storage shells 210B protrude above the grade 450 so that the storage cavities 201 can be independently and easily accessed for canister transfer and maintenance.

In the exemplified embodiment, the storage shells 210B are sufficiently below grade level so that when the canisters 100 of spent fuel are positioned in the storage cavities 201, the entire height of the canisters 100 are below the grade 450. This takes full advantage of the shielding effect of the surrounding soil. Thus, the soil provides a degree of radiation shielding for spent fuel stored that can not be achieved in aboveground facilities.

An embodiment of a method of reclaiming the energy from heat emanating from the heat emanating from a canister 100 loaded with spent nuclear fuel utilizing the energy reclamation system 1000 will be described. First, the canister 100 is loaded with spent nuclear fuel in a spent fuel pool utilizing the regional loading approach described in FIGS. 1-3 above. Upon being removed from a spent fuel pool and treated for dry storage, the spent fuel canister 100 is hermetically sealed and positioned in a transfer cask. The transfer cask is then carried by a cask crawler to an empty storage shell 210B. Any suitable means of transporting the transfer cask to a position above the storage shell 210B can be used. For example, any suitable type of load-handling device, such as without limitation, a gantry crane, overhead crane, or other crane device can be used.

In preparing the desired storage shell 210B to receive the canister 100, the lid 203 is removed so that the storage cavity 201 of the storage shell 210B is open and accessible from above. The cask crawler positions the transfer cask atop the storage shell 210B. After the transfer cask is properly secured to the top of the storage shell 210B, a bottom plate of the transfer cask is removed. If necessary, a suitable mating device can be used to secure the connection of the transfer cask to storage shell 210B and to remove the bottom plate of the transfer cask to an unobtrusive position. Such mating devices are known in the art and are often used in canister transfer procedures. The canister 100 is then lowered by the cask crawler from the transfer cask into the storage cavity 201 of the storage shell 210B until the bottom 207 of the canister 100 either rests on the support lugs or atop another previously loaded canister 100. At this time, the entire height of the canister 100 is below the grade level 450. Once the canister 100 is positioned and resting in the storage cavity 201, the lid 203 is positioned atop the storage shell 210B, substantially enclosing the storage cavity 201. The lid 203 is then secured in place via bolts or other means. When the canister 100 is so positioned within the cavity 201 of the storage shell 10B, the top and bottom portions 201B, 201A of the storage cavity 201 remain a fee volume. Moreover, the small annular gap 250 also exists between the side walls of the canister 100 and the wall of the storage shell 210B. The annular gap 250 extends between the top and bottom portion 201B, 201A of the storage cavity 201, thereby providing a passageway between the two.

As a result of the chimney effect caused by the heat emanating from the spent nuclear fuel within the canister 100, cool air from the ambient is siphoned into the air-intake cavity 202 of the air-intake shell 210A via the inlet openings 215. This cool air is then siphoned through the network of pipes 221 of the air-intake manifold 220 and distributed into the bottom portions 201A of the storage cavities 201. This cool air is then warmed by the heat emanating from the spent nuclear fuel within the canisters 100, rises within the storage cavities 201 via the annular gap 250 around the canister 80, and into the top portions 201B of the storage cavities 201 above the canisters 100. This heated air exits the storage cavities 201 via the outlet openings 207 and enters into the network of pipes 231 of the air-outlet manifold 230. The heated air exiting all of the storage cavities 201 converges within the air-outlet manifold 230 where it is directed to and aggregated within the energy reclamation cavity 302, which acts as a vertically oriented outlet plenum. As passing through the energy reclamation cavity 302, the energy of the heated air is reclaimed using the energy reclamation unit 303 as discussed above.

While the invention has been described and illustrated in sufficient detail that those skilled in this art can readily make and use it, various alternatives, modifications, and improvements should become readily apparent without departing from the spirit and scope of the invention.

What is claimed is:

1. An energy reclamation system comprising:
   at least one thermally conductive canister having a hermetically sealed cavity and a central axis, a basket disposed within the hermetically sealed cavity and comprising a grid of cells containing spent nuclear fuel emanating heat, wherein the grid of cells comprises a first region of cells and a second region of cells circumferentially surrounding the first region of cells, wherein the spent nuclear fuel is arranged so that the spent nuclear fuel contained within the first region of cells has a burnup decay power output greater than the spent nuclear fuel contained within the second region of cells;
   a storage cavity, the canister disposed within the storage cavity;
   an air-intake passageway from an ambient environment to a bottom portion of the storage cavity;
   an air-outlet passageway from a top portion of the storage cavity to an ambient environment; and
   an energy reclamation unit disposed within the air-outlet passageway.

2. The system of claim 1 wherein the grid of cells comprises a third region of cells circumferentially surrounding the second region of cells, wherein the spent nuclear fuel contained within the second region of cells has a burnup decay power energy output greater than the spent nuclear fuel contained within the third region of cells.

3. The system of claim 2 wherein the first region of cells are centrally located along the axis of the canister.

4. The system of claim 1 wherein the energy reclamation unit is a heat exchanger.

5. The system of claim 1 wherein the basket is constructed of a discontinuously reinforced aluminum/boron carbide metal matrix composite material.

6. The system of claim 5 wherein the canister comprises a canister shell formed of a heat conductive metal.

7. The system of claim 1 wherein the canister is configured to achieve a thermosiphon cyclical flow of gas within the hermetically sealed cavity.

8. An energy reclamation system comprising:
   at least one thermally conductive canister having a hermetically sealed cavity and a central axis, a basket disposed within the hermetically sealed cavity and comprising a grid of cells, wherein the grid of cells comprises a first region of cells and a second region of cells circumferentially surrounding the first region of cells;
   a first plurality of spent nuclear fuel rods contained within the first region of cells;
   a second plurality of spent nuclear fuel rods contained within the second region of cells;

wherein the first plurality of spent nuclear fuel contained within the first region of cells has a burnup decay power output greater than the second plurality of spent nuclear fuel contained within the second region of cells;

a storage cavity, the canister disposed within the storage cavity;

an air-intake passageway from an ambient environment to a bottom portion of the storage cavity;

an air-outlet passageway from a top portion of the storage cavity to an ambient environment; and an energy reclamation unit disposed within the air-outlet passageway.

9. An energy reclamation system comprising:

at least one thermally conductive canister having a hermetically sealed cavity and a central axis, a basket disposed within the hermetically sealed cavity and comprising a grid of cells, wherein the grid of cells comprises a first region of cells and a second region of cells circumferentially surrounding the first region of cells;

a first plurality of spent nuclear fuel rods contained within the first region of cells;

a second plurality of spent nuclear fuel rods contained within the second region of cells;

wherein the second plurality of spent nuclear fuel contained within the second region of cells has a burnup decay power output less than the second plurality of spent nuclear fuel contained within the second region of cells;

a storage cavity, the canister disposed within the storage cavity;

an air-intake passageway from an ambient environment to a bottom portion of the storage cavity;

an air-outlet passageway from a top portion of the storage cavity to an ambient environment; and an energy reclamation unit disposed within the air-outlet passageway.

* * * * *